US012587394B2

(12) United States Patent
Breitner et al.

(10) Patent No.: US 12,587,394 B2
(45) Date of Patent: Mar. 24, 2026

(54) IDENTITY SERVICES AND AUTHENTICATION IN DISTRIBUTED NETWORKS

(71) Applicant: DFINITY STIFTUNG, Zürich (CH)

(72) Inventors: Joachim Breitner, Freiburg im Breisgau (DE); Jan Camenisch, Thalwil (CH); Björn Tackmann, Zürich (CH); Dominic Williams, Palo Alto, CA (US)

(73) Assignee: DFINITY STIFTUNG, Zürich (CH)

( * ) Notice: Subject to any disclaimer, the term of this patent is extended or adjusted under 35 U.S.C. 154(b) by 80 days.

(21) Appl. No.: 18/559,246

(22) PCT Filed: May 6, 2022

(86) PCT No.: PCT/EP2022/062379
§ 371 (c)(1),
(2) Date: Nov. 6, 2023

(87) PCT Pub. No.: WO2022/234137
PCT Pub. Date: Nov. 10, 2022

(65) Prior Publication Data
US 2024/0305477 A1      Sep. 12, 2024

Related U.S. Application Data

(60) Provisional application No. 63/185,687, filed on May 7, 2021.

(51) Int. Cl.
H04L 9/32 (2006.01)
H04L 9/30 (2006.01)

(52) U.S. Cl.
CPC .......... H04L 9/3268 (2013.01); H04L 9/3073 (2013.01)

(58) Field of Classification Search
CPC ........................... H04L 9/3268; H04L 9/3073
(Continued)

(56) References Cited

U.S. PATENT DOCUMENTS

2012/0198084 A1      8/2012   Keskitalo et al.
2012/0260330 A1      10/2012  Zlatarev et al.
(Continued)

FOREIGN PATENT DOCUMENTS

CN        108737435 B      9/2020

OTHER PUBLICATIONS

International Search Report and Written Opinion for Application No. PCT/EP2022/062379, mailed Nov. 21, 2022, 15 pages.

*Primary Examiner* — Anthony D Brown
(74) *Attorney, Agent, or Firm* — Mannava & Kang, P.C

(57) ABSTRACT

According to an embodiment of an aspect of the invention, there is a computer-implemented method for authenticating users of a network. The method comprises steps of maintaining, by an identity service, user accounts under a main user identifier, wherein the user accounts support a method of authentication by the user. The method further comprises generating, by an application frontend, a session public key of a public key verification scheme and providing, by the application frontend, the session public key to the identity service. Further steps include obtaining, by the application frontend, a certification from the identity service, the certification comprising the session public key and an application user identifier. The application user identifier is derived from the main user identifier and an application frontend identifier.

20 Claims, 8 Drawing Sheets

(58) Field of Classification Search
USPC ......................................................... 713/156
See application file for complete search history.

(56) References Cited

U.S. PATENT DOCUMENTS

| | | | |
|---|---|---|---|
| 2017/0230187 A1 | 8/2017 | Li et al. | |
| 2018/0212785 A1 | 7/2018 | Peddada et al. | |
| 2019/0260594 A1 | 8/2019 | Singhal et al. | |
| 2022/0245594 A1* | 8/2022 | Baid | G06F 21/6245 |
| 2022/0300639 A1* | 9/2022 | Bellman, Jr. | G06F 21/6245 |

\* cited by examiner

100

Node of SN0
Node of SNA
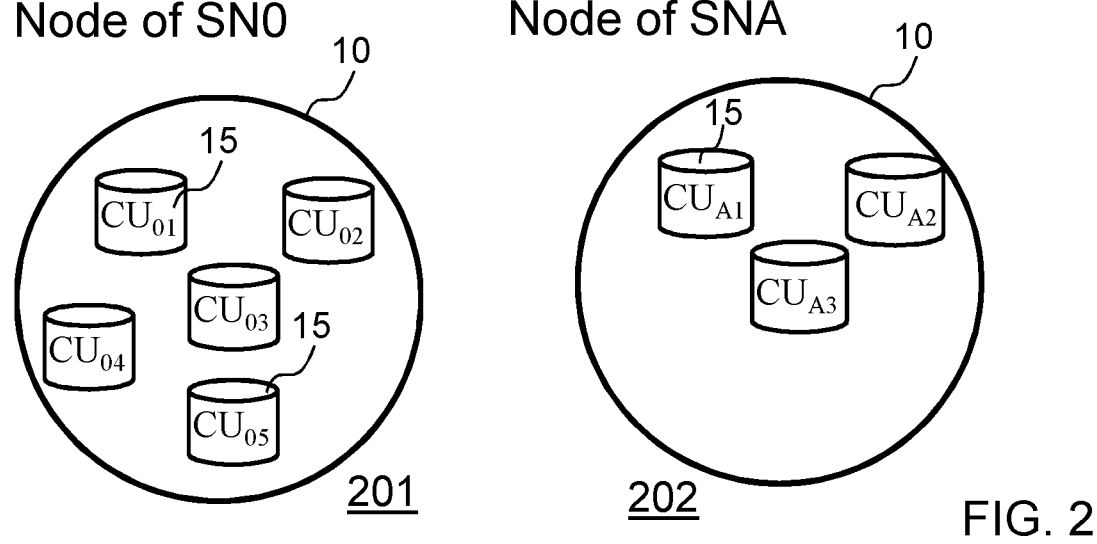
201                    202                    FIG. 2
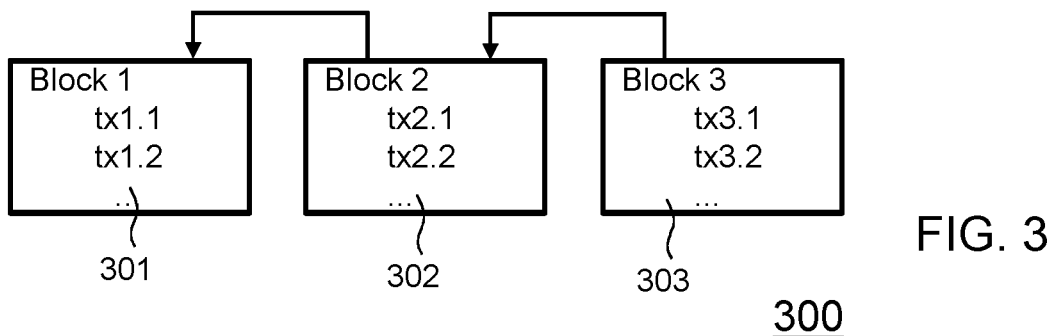
FIG. 3
300

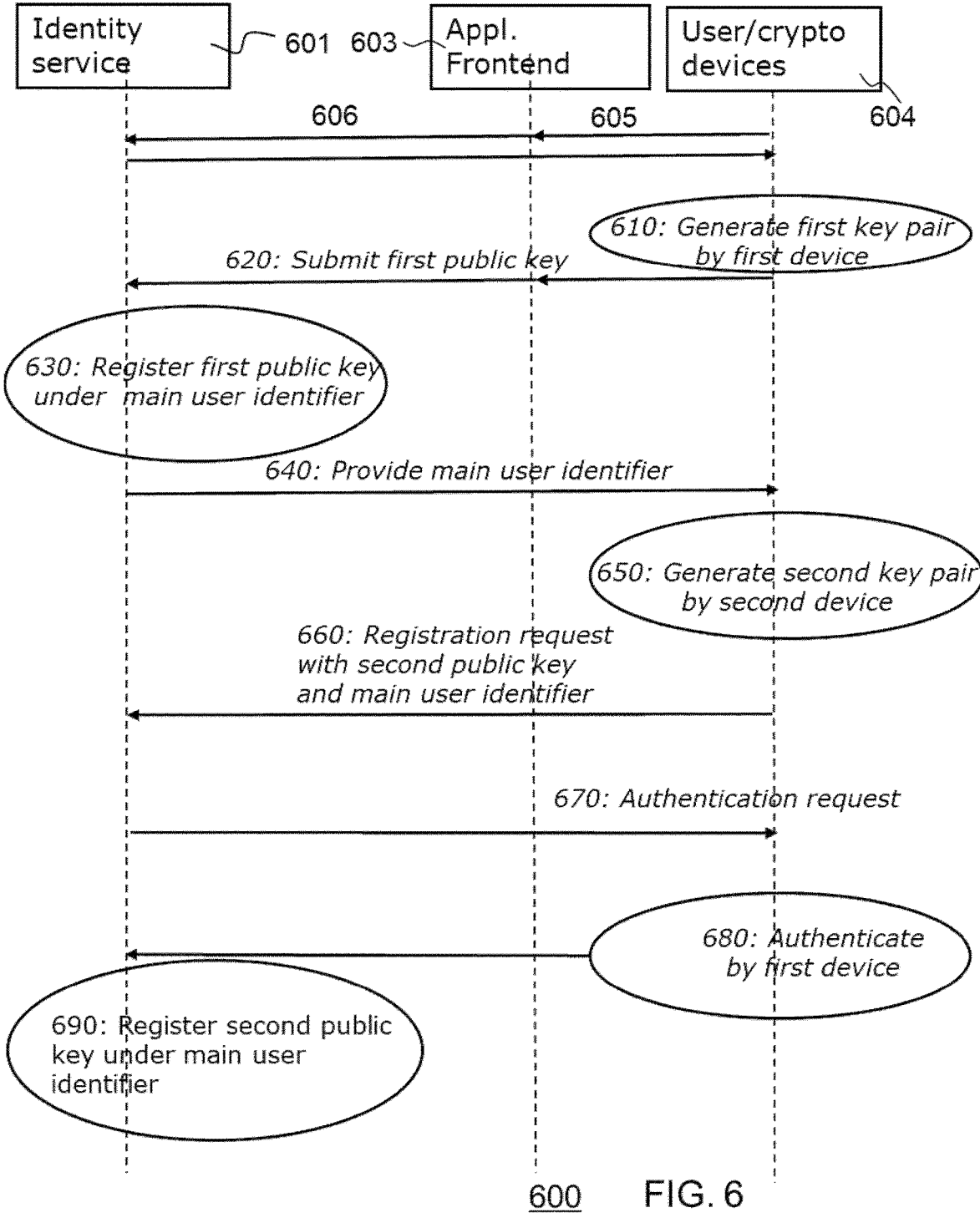
600     FIG. 6

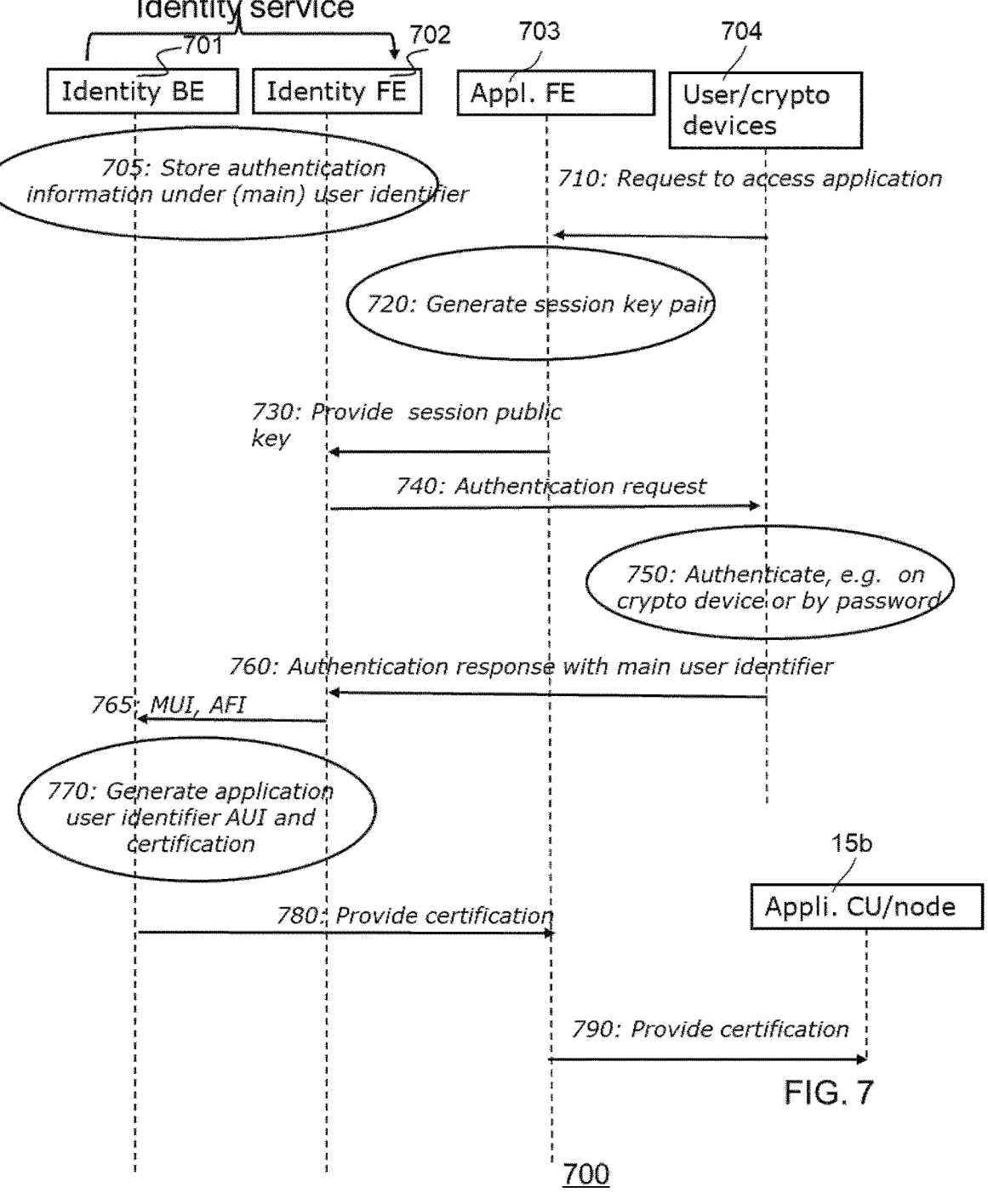

Identity service 701   702   703   704

| Identity BE | Identity FE | Appl. FE | User/crypto devices |

705: Store authentication information under (main) user identifier

710: Request to access application

720: Generate session key pair

730: Provide session public key

740: Authentication request

750: Authenticate, e.g. on crypto device or by password

760: Authentication response with main user identifier

765: MUI, AFI

770: Generate application user identifier AUI and certification

15b

Appli. CU/node

780: Provide certification

790: Provide certification

IDENTITY SERVICES AND AUTHENTICATION IN DISTRIBUTED NETWORKS

CLAIM FOR PRIORITY

The present application is a national stage filing under 35 U.S.C 371 of PCT application number PCT/EP2022/062379, having an international filing date of May 6, 2022, which claims priority to U.S. patent application No. 63/185,687 having a filing date of May 7, 2021, the disclosures of which are hereby incorporated by reference in their entireties.

TECHNICAL FIELD

The present invention pertains to a computer-implemented method for managing identities and network, in particular a authenticating users of a distributed network.

Further aspects relate to a distributed network, a node a distributed network and a corresponding computer program product.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may call small programs known e.g. as smart contracts.

In order for a transaction to be written to the blockchain, it must be "validated" and agreed upon by the network. In other words, the network nodes have to reach consensus on blocks to be written to the blockchain. Such a consensus may be achieved by various consensus protocols.

In one type of blockchain networks, consensus is achieved by using a proof-of-work algorithm. A proof-of-work consensus protocol generally requires some work from the parties participate in the consensus protocol, usually corresponding to processing time by a computer. Proof-of-work-based cryptocurrency systems such as Bitcoin involve the solving of computationally intensive puzzles to create new blocks.

Another type of consensus protocols is based on a proof-of-stake algorithm. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Consensus protocols used in blockchain networks can be designed to reach fast finality on transactions contained in blocks by applying a "Byzantine fault tolerant" (BFT) agreement protocol. "Synchronous" BFT protocols rely on network synchrony assumptions for safety, while "asynchronous" BFT protocols do not. Asynchronous BFT protocols can typically tolerate less than ⅓ (one third) corrupt participating nodes.

Apart from cryptocurrencies, distributed networks may be used for various other applications.

In particular, they may be used for providing decentralized and distributed computing capabilities and services.

One challenge of such distributed networks which provide distributed computing services is to provide efficient mechanisms for managing the identities of user, e.g. for login, authentication and/or authorization purposes.

DISCLOSURE OF THE INVENTION

Accordingly, one object of an aspect of the invention is to provide an advantageous method for managing identities in distributed networks.

A further object of an aspect of the invention is to provide an advantageous method for authenticating users of a network, in particular in a user-friendly and efficient manner.

A further object of an aspect of the invention is to provide an advantageous method for performing/executing signatures on behalf of a user in such a network.

According to an embodiment of an aspect of the invention, a computer-implemented method for authenticating users of a network is provided.

The method comprises steps of maintaining, by an identity service, user accounts under a main user identifier, wherein the user accounts support a method of authentication by the user. The method further comprises generating, by an application frontend, a session public key of a public key verification scheme and providing, by the application frontend, the session public key to the identity service. Further steps include obtaining, by the application frontend, a certification from the identity service, the certification comprising the session public key and an application user identifier. The application user identifier is derived from the main user identifier and an application frontend identifier.

Such an embodied method provides an identity service where a user can log in by authenticating herself and then register a plurality of user devices under the main user identity. If the user then wants to log in to an application or application service which is running on or provided by the network, e.g. to an application (software) (software app), the user is redirected to the identity service. The identity service may then authenticate the user to one of the registered devices and generates or creates an application user identifier which represents an identifier for the user which is specific to the respective application and an associated certification/certificate on the application user identifier.

The certification/certificate may then be used to authenticate to the application or application service provided by the respective application software.

This is an efficient and user friendly method for authenticating to (software) applications providing application services to users of a distributed network, in particular in cases where a user has several devices. As an example, it avoids that a user has to authenticate all her devices separately to all the software applications or application services provided by the network.

According to an embodiment, the method further comprises submitting, by the application frontend, the obtained certification and the application user identifier to an application provider. The application provider is configured to provide applications or applications services to users of the network.

The certification may then be used to authenticate to the application/application computational unit corresponding to the application user identifier.

The application provider may be embodied as a node of the network which hosts the application service or the application, in particular as an application computational unit.

According to an embodiment, the step of obtaining the certification comprises generating authentication information that is valid with respect to a public key of the identity service.

According to such an embodiment, the certification may comprise a signature under the public key of the identity service. The corresponding signature may be verified with the public key of the identity service.

According to an embodiment, the method, in particular the step of obtaining the certification, may comprise generating a separate cryptographic key pair, in particular an application user identifier key pair, for each pair of a respective main user identifier and a respective application frontend identifier. The separate cryptographic key pair may comprise a public key and a private key, in particular an application user identifier public key and an application user identifier secret key. The separate key pair may be denoted as application user identifier (AUI) key pair comprising an application user identifier public key and application user identifier secret/private key.

Such an embodiment further increases the security of the network. In particular, in such a case the certification may comprise a signature under the public key of the AUI key pair which is individual for the respective combination main user identifier-application frontend identifier.

The signature with the private key of the separate key pair may be verified by the corresponding computational unit by verifying the chain of trust to a root public key of the network or in general by using verification chain techniques of public key infrastructure systems.

According to an embodiment, the application user identifier may be derived from the public key of the separate cryptographic key pair.

According to embodiments, the application user identifier may be a hash of the public key of the separate cryptographic key pair or the application user identifier may correspond to the public key of the separate cryptographic key pair.

According to an embodiment, the separate cryptographic key pair may be deterministically calculated from the main user identifier and the application frontend identifier.

The certification may comprise a validity term which specifies a validity period of the session public key.

According to embodiments, the certification may comprise a signature under a public key of the identity service.

According to embodiments, the certification may comprise a signature under a public key of the separate cryptographic key pair corresponding to the application user identifier.

The certification may establish an authorization or delegation, in particular a temporary authorization or delegation to the application frontend to authenticate and/or to execute a signature under the application user identifier.

The application user identifier may be derived from the main user identifier, the application frontend identifier and a secret salt.

According to embodiments, the secret salt may be always the same and maintained by the identity service. The purpose of the salt is to avoid tracking and counter brute force attacks. The secret salt may also be denoted as secret seed.

According to embodiments the application frontend establishes an interface, in particular a temporary interface, between a user of the distributed network and an application computational unit. The application computational unit is configured to provide applications or applications services to users of the network and may be e.g. a software application that is running on a node of the distributed network.

According to embodiments the application frontend may run in or on a browser. The browser may be configured to generate and manage the session public key and the corresponding session private key.

According to embodiments, the main user identifier may be a user name or a natural number.

According to embodiments, the network is a distributed network comprising one or more replicated computing clusters. The replicated computing clusters comprise a plurality of nodes, wherein each of the plurality of nodes of the replicated computing cluster is configured to run a replica and each of the replicas is configured to run one or more computational units. The computational units encompass application computational units for performing application services to users of the network and identity computational units for providing the identity service.

According to embodiments, the network comprises a plurality of subnetworks, wherein each of the plurality of subnetworks comprises a set of assigned nodes. Replicas of the assigned nodes of the plurality of subnetworks are configured to perform a deterministic and replicated computation across their respective subnetworks, thereby forming a plurality of replicated computing clusters. The network comprises a dedicated subnetwork being configured to run the identity computational units.

According to an embodiment of another aspect of the invention, a computer-implemented method for managing identities in a network is provided. The method comprises steps of generating, by a first device, a first cryptographic key pair comprising a first public key, submitting, by a user of the first device, the first public key to an identity service and registering, by the identity service, the first public key with respect to or in in relation to or under a main user identifier. The method further comprises generating, by a second device of the user, a second cryptographic key pair comprising a second public key, submitting, by the user of the first and the second device, the main user identifier and the second public key to the identity service and providing, by the identity service, to the user of the first and the second device, an authentication request or authentication form to authenticate with respect to the first public key. Further steps include generating, by the first device, authentication information that is valid with respect to the first public key, receiving, by the identity service, an authentication response comprising the authentication information of the first device being valid with respect to the first public key and registering or in other words adding, upon successful authentication, the second public key under the main user identifier or in other words in relation to the main user identifier.

According to embodiments, the first device and/or the second device is a secure hardware device, in particular a security chip, in particular a trusted platform module according to the TCG-specification of the Trusted Computing Group.

According to an embodiment, providing the authentication request may comprise providing a link, a barcode or authentication means. The link, the barcode or the other authentications means may comprise an authentication form to authenticate with respect to the first public key.

According to an embodiment, the method may comprise authenticating with respect to the first public key and/or the second public key by means of a face scan, a fingerprint and/or a password of e.g. a local authentication device such as a TPM chip.

According to an embodiment of another aspect of the invention, a network is provided configured to perform one or more steps of the method aspects of the invention.

According to an embodiment of another aspect of the invention, a node of a network is provided configured to perform one or more steps of the method aspects of the invention According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 2 illustrates in a more detailed way computational units running on an exemplary node of the network;

FIG. 3 illustrates the creation of blocks in distributed networks according to embodiments of the invention;

FIG. 6 shows a flow chart of methods steps of a computer-implemented method according to an embodiment of the invention;

FIG. 7 shows a flow chart of methods steps of a computer-implemented method according to an embodiment of the invention.

MODES FOR CARRYING OUT THE INVENTION

Figure 1:
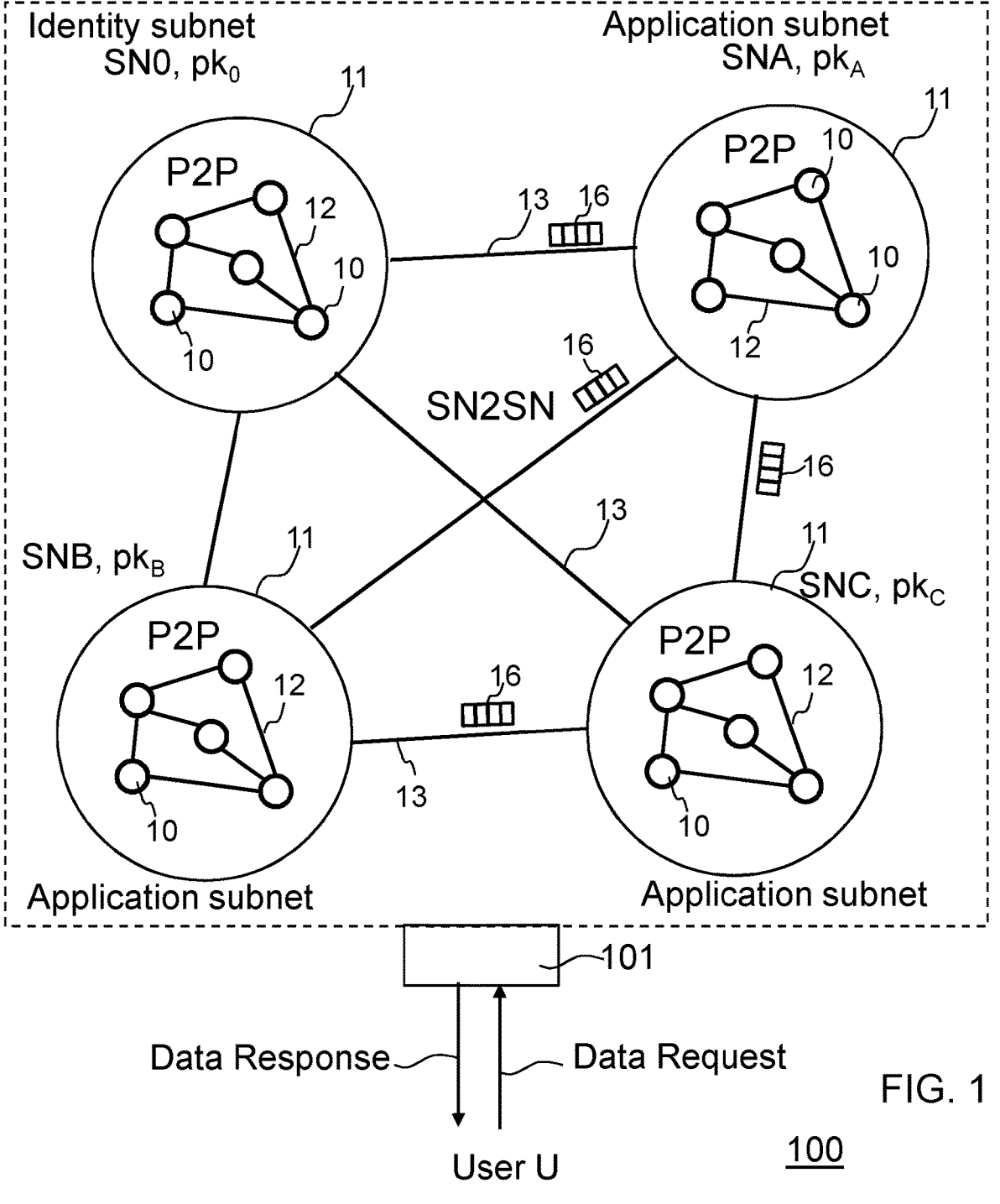
FIG. 1 shows an exemplary diagram of a distributed network according to an embodiment of the invention.

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A verification key: a bit-string of a public key verification or signature scheme intended to be widely publicized. A verification key may also be denoted as public key and may be used e.g. for the verification of digital signatures of the public key signature scheme.

A public key verification scheme or public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key, enabling some cryptographic operation, in particular digitally signing a message and/or encrypting a ciphertext. A secret key may also be denoted as private key.

Distributed key generation (DKG): a protocol enabling a set of dealers to create a public key, in particular a verification key, and provide a set of receivers with a secret key share of the corresponding secret key.

An identity service according to embodiments of the invention shall be understood as a service configured to provide services related to an identity of a user or a user device and/or for managing identities of users or user devices of a network.

An application frontend shall according to embodiments of the invention shall be understood as a frontend or in other words a user interface between a user or a user device and an application or application software running on a network. The application frontend will be established on the user device. According to embodiments of the invention it may run on the browser of the user device.

A session public key shall be understood according to embodiments of the invention as a public key of a public key verification scheme or more generally of a cryptographic key pair which is generated and used for a corresponding session of a frontend application. The pair session public key-session private key may be in particular generated by a cryptographic device such as a secure chip or secure token. According to embodiments the session public key is a temporary key as defined by the expiration period of the certification. It should be noted that the session public key may be used a plurality of times during a session, e.g. to sign messages.

An application user identifier shall be understood according to embodiments of the invention as an identifier that provides an identity for a user of the distributed network with or for a corresponding application or application service of the network. An application user identifier may be derived from a main user identifier and an application frontend identifier.

A main user identifier shall be understood according to embodiments of the invention as an identifier under which a user may register one or more devices, in particular cryptographic devices, with an identity service of a network.

An application frontend identifier relates to an identity of the application frontend.

An application frontend identifier according to embodiments of the invention is an identifier of a frontend between a user/user device and an application/application service of a network, in particular an application computational unit.

The application frontend identifier may be considered as metadata of the communication between the application frontend and the identity service and may be obtained by the underlying communication protocol in a secure manner. In other words, the means of communication between the application frontend and the identity service provide as application frontend identifier a trustworthy indication to the origin of the respective request. As an example, the origin of the frontend may be used as the frontend identifier. According to embodiments the origin may be defined by the scheme (protocol), hostname (domain), and port of the URL used to access it. According to embodiments two objects/frontends have the same origin only when the scheme, hostname, and port all match.

According to embodiment main user identifier, application frontend identifier and application user identifier may be also denoted as first, second and third identifier.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are distributed over a plurality of subnetworks 11. The plurality of subnetworks 11 may in the following also be denoted as subnets 11. In the example of FIG. 1, four subnets 11 denoted with SN0, SNA, SNB and SNC are provided.

Each of the plurality of subnets 11 is configured to run a set of computational units on each node 10 of the respective subnet 11. According to embodiments, a computational unit shall be understood as a piece of software, in particular as a piece of software that comprises or has its own unit state. The unit state may also be denoted as execution state.

The subnet SN0 establishes a first subnet and may also be denoted as root subnet or identity subnet. The identity subnet SN0 may be in particular embodied as governance subnet which performs various governance or in other words management functions for the distributed network 100. In particular, the root subnet perform identity services.

The subnets SNA, SNB and SNC are embodied as application subnets. The application subnets may be in particular configured to provide (application) services to users of the distributed network. More particularly, the computational units which run on the application subnets SNA, SNB and SNC are configured to provide (application) services to users of the distributed network. The application services may be any kind of digital services or digital applications such as banking services, financial services, booking services, games, social media, computing services etc.

The network 100 comprises communication links 12 for intra-subnet communication within the respective subnet 11, in particular for intra-subnet unit-to-unit messages to be exchanged between computational units assigned to the same subnet.

Furthermore, the network 100 comprises communication links 13 for inter-subnet communication between different ones of the subnets 11, in particular for inter-subnet unit-to-unit messages to be exchanged between computational units assigned to different subnets. According to embodiments, the distributed network may be in particular configured to exchange inter-subnet messages 16 between the subnets SNA, SNB, SNC and SND via a messaging protocol.

According to embodiments, a unit state or execution state shall be understood as all the data or information that is used by the computational unit, in particular the data that the computational unit stores in variables, but also data the computational units get from remote calls. The unit state/execution state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments of the invention the subnets 11 are configured to replicate the set of computational units across the respective subnet 11. More particularly, the subnets 11 are configured to replicate the unit state/execution state of the computational units across the respective subnet 11.

Each of the subnets 11 holds an individual or in other words separate public key/verification key of a public-key signature scheme. In this example the subnet SN0 holds a verification key $pk_0$, the subnet SNA holds a verification key $pk_A$, the subnet SNB holds a verification key $pk_B$ and the subnet SNC holds a verification key $pk_C$. A verification key may be in the following generally referred to as $pk_X$, wherein X denotes a corresponding subnet. The public keys/verification keys of the applications subnets SNA, SNB and SNC may be in the following denoted as application subnet public keys.

The network 100 may comprise a plurality of interfaces 101 that may be used to exchange information with requesting entities or users U of the distributed network. As the users U may send (read) requests via the interface 101 to the distributed network and receive a (read) response, e.g. execution state information comprising computational results.

FIG. 2 illustrates in a more detailed way computational units 15 running on nodes 10 of the network 100. The network 100 is configured to assign each of the computational units which are running on the network 100 to one of the plurality of subnets, in this example to one of the subnets SN0, SNA, SNB or SNC according to a subnet-assignment.

More particularly, FIG. 2 shows on the left side 201 a node 10 of the root subnet SN0 of FIG. 1. The subnet assignment of the distributed network 100 has assigned a subset of five computational units 15 to the root subnet SN0, more particularly the subset of computational units CU01, CU02, CU03, CU04 and CU05. The assigned subset of computational units CU01, CU02, CU03, CU04 and CU05 runs on each node 10 of the subnet SN0. Furthermore, the assigned subset of computational units is replicated across the whole subnet SN0 such that each of the computational units CU01, CU02, CU03, CU04 and CU05 traverses the same unit states/execution states.

Furthermore, FIG. 2 shows on the right side 202 a node 10 of the application subnet SNA of FIG. 1 on which three computational units 15 are run, more particularly the set of computational units $CU_{A1}$, $CU_{A2}$ and $CU_{A3}$. The set of computational units $CU_{A1}$, $CU_{A2}$ and $CU_{A3}$ runs on each node 10 of the subnet SNB. Furthermore, the set of computational units is replicated across the whole subnet SNA such that each of the computational units $CU_{A1}$, $CU_{A2}$ and $CU_{A3}$ has the same unit state/execution state. The computational units $CU_{A1}$, $CU_{A2}$ and $CU_{A3}$ may be configured to provide application services or applications to users of the network. The computational units $CU_{A1}$, $CU_{A2}$ and $CU_{A3}$ may establish/provide software applications or in general applications for the users of the network.

FIG. 3 illustrates the creation of blocks in distributed networks according to embodiments of the invention. The blocks may be in particular input blocks which are to be processed by the computational units of an execution subset. The blocks which are to be processed by the execution subset have been agreed upon by a consensus subset of the respective nodes of the subnet.

In this exemplary embodiment three input blocks 301, 302 and 303 are illustrated. Block 301 comprises a plurality of transactions, namely the transactions tx1.1, tx1.2 and possibly further transactions indicated with dots. Block 302 comprises also a plurality of transactions, namely the transactions tx2.1, tx2.2 and possibly further transactions indicated with dots. Block 303 also comprises a plurality of transactions, namely the transactions tx3.1, tx3.2 and possibly further transactions indicated with dots. The input blocks 301, 302 and 303 are chained together. More particularly, each of the blocks comprises a block hash of the previous block. This cryptographically ties the current block to the previous block (s).

According to embodiments the transactions may be in particular execution messages which are to be executed by the nodes of the execution subset.

According to embodiments, the input blocks 301, 302 and 303 may be created by a proof-of-stake consensus-protocol.

However, it should be noted that the input blocks generated by the consensus component do not need to be chained together according to embodiments. Rather any consensus protocol that reaches some kind of consensus between the nodes on the selection and/or processing order of received messages may be used according to embodiments.

Figure 4:
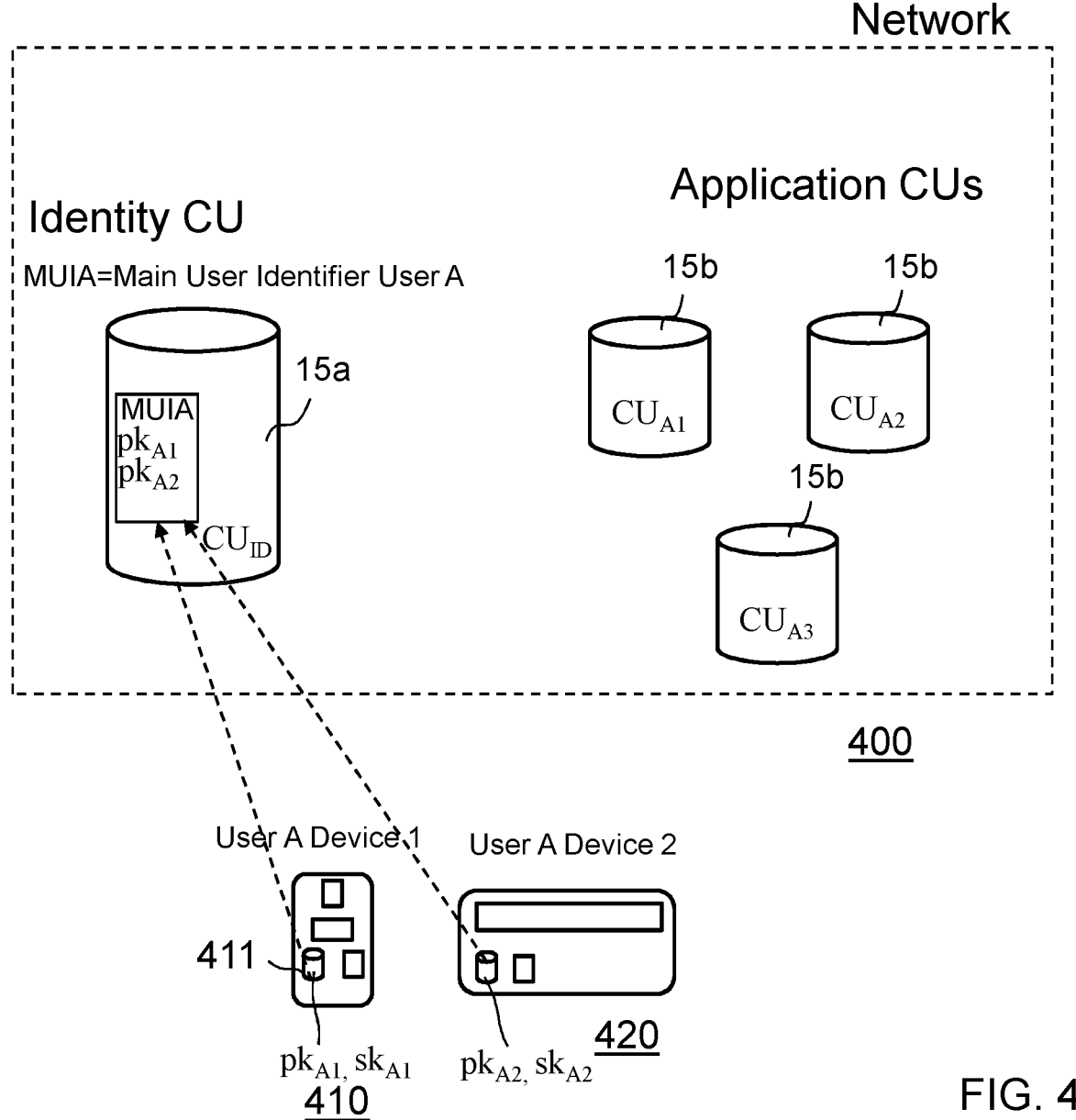
FIG. 4 shows an exemplary diagram of a network according to an embodiment of the invention.

FIG. 4 shows a network 400 according to an embodiment of the invention. FIG. 4 illustrates an example how several devices of a user may be registered under a main user identifier MUI.

The network 400 comprises an identity computational unit 15a which is configured to provide identity services or in other words to manage identities in the network 400. The identity computational unit 15a may also be denoted as $CU_{ID}$. The network 400 comprises several application computational units 15b which are configured to provide application services or applications. The application computational unit $CU_{A1}$ may provide a first application (first software application), the application computational unit $CU_{A2}$ may provide a second application (second software application) and the application computational unit $CU_{A3}$ may provide a third application (third software application).

A user may have user devices comprising cryptographic components such as a laptop 420 or a smartphone 410 comprising a secure chip or it may have a security-token such as a YubiKey provided by the company Yubico. The user devices may also be denoted as cryptographic devices or just devices.

The identity computational unit 15a provides the functionality to register a plurality of user devices, in particular secure/security user devices or secure chips under a main user identifier MUI. The main user identifier may be e.g. a user name or a natural number according to embodiments.

According to the example illustrated in FIG. 4 a user A has a main user identifier MUIA. Under this main user identifier MUIA there are registered a plurality of public keys, more particularly a public key $pk_{A1}$ of a first user device of the user A, in this example the smartphone 410, and a public key $pk_{A2}$ of a second user device of the user A, in this example the laptop 420. The public keys are public keys of a public key verification scheme and accordingly each of the public keys has an associated secret key, in this example the secret keys $sk_{A1}$ and $sk_{A2}$. The public key pair ($pk_{A1}$, $sk_{A1}$) may be stored in a secure chip 411 of the user device 410 and the public key pair ($pk_{A2}$, $sk_{A2}$) may be stored in a secure chip 421 of the user device 420.

FIG. 6 shows a corresponding flow chart 600 of methods steps of a computer-implemented method for managing identities in a distributed network according to an embodiment of the invention, more particularly of a corresponding registration process for the registration of several user devices of a user under a main user identifier MUI.

The steps of the method involve an identity service 601, which may be provided e.g. by the identity computational unit 15a of FIG. 4. The method further involves an application frontend 603 which provides a frontend to one of the application services provided by the distributed network, e.g. to one of the computational units 15b of FIG. 4. The method further involves a plurality of user devices 604. The user devices 604 may comprise e.g. the user devices 410 and 420 of FIG. 4. The application frontend 603 establishes an interface between the user devices 604 and an application computational unit, e.g. one of the application computational units 15a of FIG. 4.

At a step 605, a user wants to log in to an application of the network for the first time via the frontend application 603. The user is then redirected, at step 606, to the identity service 601 in order to register with the identity service. The identity service 601 may comprise an identity backend and an identity frontend which are not separately illustrated in this example.

At a step 610, a first cryptographic user device 604, e.g. the user device 410 of FIG. 4, generates a first cryptographic key pair comprising a first public key $pk_{A1}$.

At a step 620, the first user device 604 submits the first public key $pk_{A1}$ to the identity service 601, e.g. to the identity computational unit 15a shown in FIG. 4.

At a step 630, the identity computational unit 15a registers the first public $pk_{A1}$ with respect to or in relation to or under a main user identifier, e.g. the main user identifier MUIA of FIG. 4. The main user identifier MUIA may be a user name or a natural number.

At a step 640, the identity service 601 provides the main user identifier to the application frontend 603.

If then the user wants to register another user device/cryptographic device such as the user device 420, the second cryptographic device 420 generates, at a step 650, a second cryptographic key pair comprising a second public key $pk_{A2}$ and submits it at a step 660 to the frontend of the identity service.

At a step 670, the frontend redirects the request and asks the user to authenticate with the identity service. Accordingly, the user is connected with the identity service and authenticates by means of the first device to the identity service, more particularly by generating authentication information that is valid with respect to the first public key.

At a step 690, the identity service receives the authentication response comprising the authentication information of the first cryptographic device with respect to the first public key and registers, upon successful authentication, the second public key under/in relation to the main user identifier or in other words it adds the second public key to the registered main user identifier.

The same procedure, i.e. steps 650 to 690 may be repeated to add/register further public keys to/under the main user identifier.

Figure 5A:
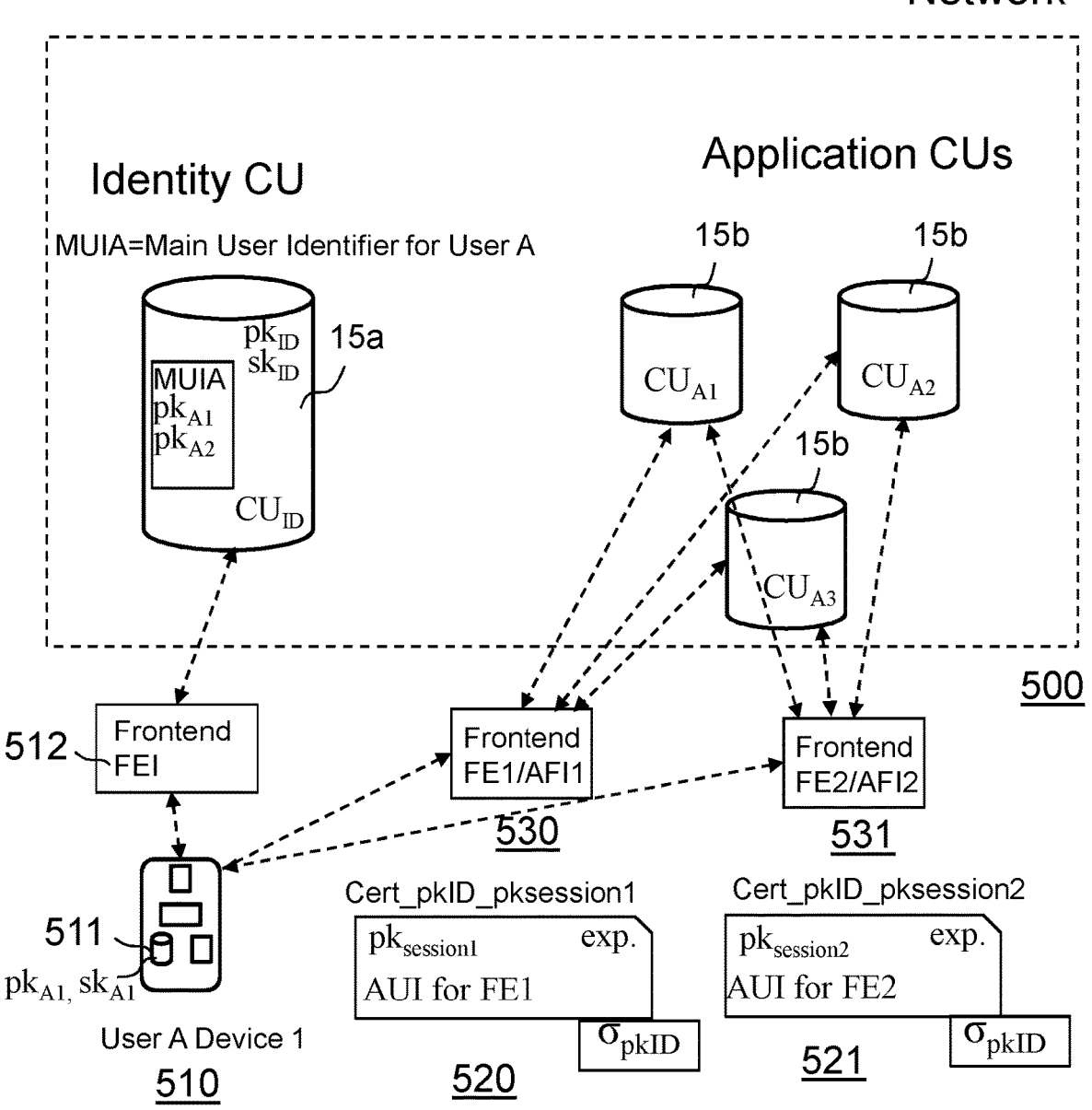
FIG. 5a shows an exemplary diagram of a network according to an embodiment of the invention.

FIG. 5a shows a network 500 which may correspond to the network 400. The network 500 comprises an identity computational unit 15a for providing identity services and several application computational units 15b for providing application services. FIG. 5a illustrates an embodiment according to which separate application user identifiers (AUIs) are generated for each application frontend, wherein a common public key $pk_{ID}$ provided by the identity server is used for signing certifications.

The identity service provided by the identity computational unit 15a maintains a plurality of user accounts. Each user account has a main user identifier MUI. In general, the user accounts may support any suitable method of authentication by the user. Accordingly, the user may authenticate to the user account by any suitable authentications means such as a password or a security device/security chip. In FIG. 5a it is assumed that the user A has a smartphone 510 with a secure chip 511 which stores a cryptographic key pair $pk_{A1}$, $sk_{A1}$. The public key $pk_{A1}$ and optionally further public keys $pk_{A2}$, $pk_{A1}$ of further devices of the user A are stored under the main user identifier MUIA at the computational unit 15a.

The computational unit 15a further maintains a cryptographic key pair $pk_{ID}$, $sk_{ID}$ which can be used by the computational unit 15a to sign certifications, e.g. the certifications 520 and 521. Hence according to such an embodiment the computational unit 15a uses the same cryptographic key pair $pk_{ID}$, $sk_{id}$ to provide signatures for the various certifications.

The certification 520 comprises a session public key $pk_{session\ 1}$, an application user identifier AUI and a validity term "exp." which may specify a validity period of the session public key.

The application user identifier is derived from the main user identifier MUIA and from an application frontend identifier, in this example from the application frontend identifier AFI1 corresponding to an application frontend FE1, 530. The application frontend FE1, 530 may establish an interface between the user A and one of the application computational units, i.e. one of the application computational units $CU_{A1}$, $CU_{A2}$ or $CU_{A3}$. The certification 520 is signed by a digital signature $\sigma_{pkID}$ under the public key $pk_{ID}$ of the identity service.

The certification 520 establishes a authorization or delegation, in particular a temporary authorization or delegation, to the application frontend 530 to authenticate and/or to execute a signature under the corresponding application user identifier, in particular a signature with the private session key corresponding to the public session key which may be denoted as $sk_{session1}$.

The certifications 520, 521 can be used by the user to authenticate to applications running on the network 500, in particular to one of the application computational units $CU_{A1}$, $CU_{A2}$ or $CU_{A3}$. More particularly, the respective application computational unit may verify the signature $\sigma_{pkID}$ under the certificate with the public key $pk_{ID}$ and thereby also verify/authenticate the public session key $pk_{session1}$.

It should be noted that according to embodiments of the invention a respective application frontend 530 establishes an (temporary) interface and a corresponding identity between the user and one of the application computational units.

Accordingly, assuming e.g. that the application frontend FE1, 530 has been established between the user A or more particularly between a device of the user A and the computational unit $CU_{A1}$ and the user A wants then to access another application provided by the computational unit $CU_{A2}$ via the application frontend FE1, then the user may do this, but with the frontend identity of the frontend FE1.

Alternatively the user may establish another application frontend, e.g. an application frontend 531, FE2, with a different frontend identity FE2.

The application frontend FE2, 531 may use e.g. a certification 521 to authenticate to the computational unit $CU_{A2}$. The certification 521 comprises a session public key $pk_{session\ 2}$, an application user identifier AUI for the application frontend FE2, 531 and a validity term "exp." which may specify a validity period of the session public key.

The application user identifier AUI is derived from the main user identifier MUIA and from an application frontend identifier AFI2 corresponding to the application frontend FE2, 531.

The user A or more particularly her device 510 may communicate with the identity computational unit 15a via an identity frontend 512.

Figure 5B:
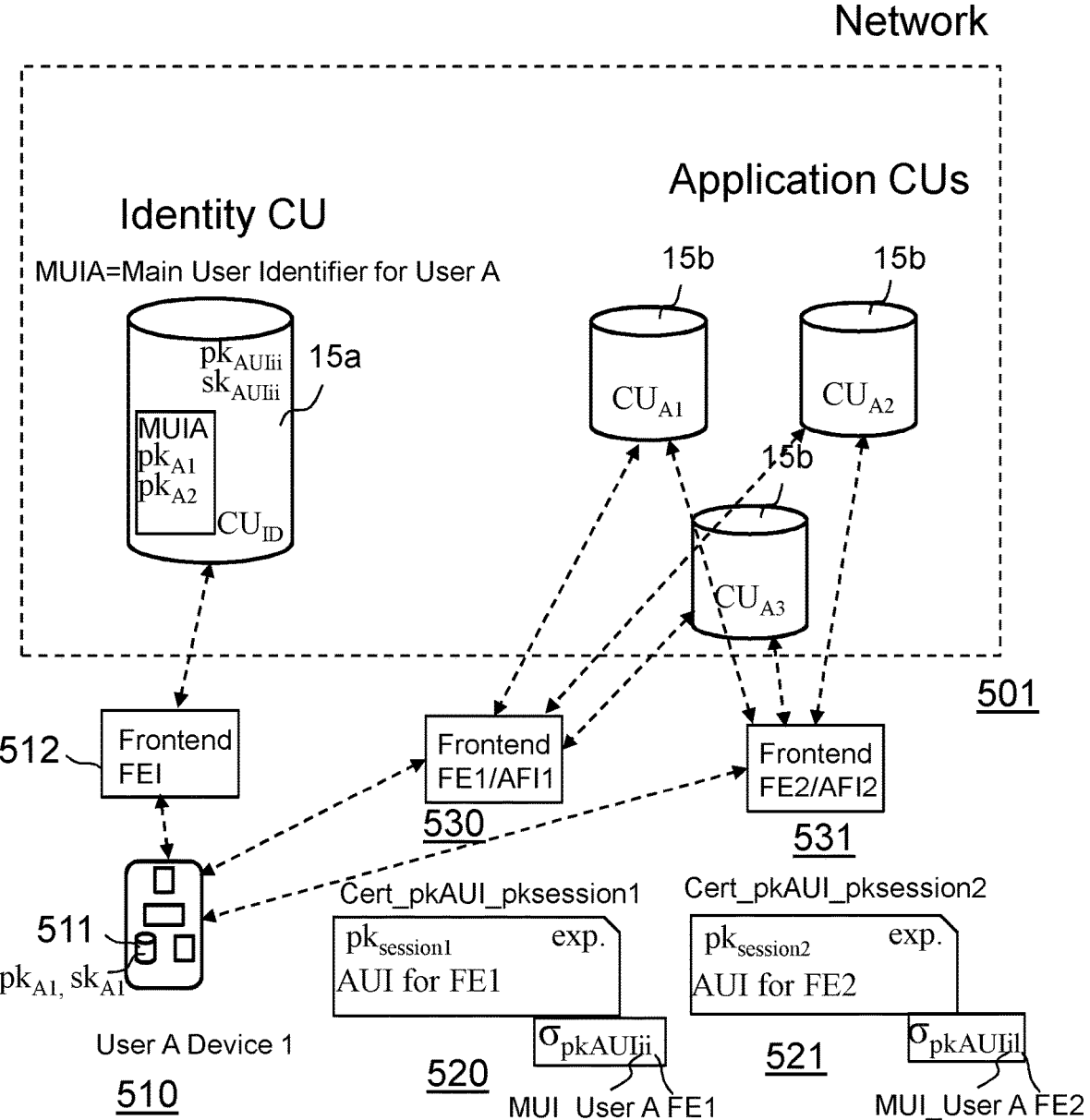
FIG. 5b shows an exemplary diagram of a network according to an embodiment of the invention.

FIG. 5b shows a network 501 which corresponds mainly to the network 500. The network 501 comprises also an identity computational unit 15a for providing identity services and several application computational units 15b for providing application services. FIG. 5b illustrates an embodiment according to which a separate cryptographic key pair is generated for each pair of application frontend identifier/main user identifier. Furthermore, according to embodiments the public key of the separate cryptographic key pair may be deterministically determined by the corresponding application frontend identifier and the main user identifier.

The identity service provided by the identity computational unit 15a maintains a plurality of user accounts. Each user account has a main user identifier MUI. In general, the user accounts may support any suitable method of authentication by the user. Accordingly, the user may authenticate to the user account by any suitable authentications means such as a password or a security device/security chip. In FIG. 5b it is assumed that the User A has a smartphone 510 with a secure chip 511 which stores a cryptographic key pair $pk_{A1}$, $sk_{A1}$. The public key $pk_{A1}$ and optionally further public keys $pk_{A2}$, $pk_{A1}$ of further user devices of user A are stored under the main user identifier MUIA at the identity computational unit 15a.

The identity computational unit 15a of FIG. 5b maintains or computes a separate cryptographic key pair for each pair of a main user identifier (MUI) and an application frontend identifier (AFI). This separate key pair may be denoted as application user identifier key pair or in short AUI key pair. The application user identifier key pair comprises an application user identifier public key $pk_{AUIii}$ and an application user identifier private key $sk_{AUIii}$, wherein ii denotes an index of the respective pair MUI/AFI. In other words, the first i is an index for the respective main user identifier and the second i is an index for the respective application frontend. As example, the first index i may denote the main user identifier MUIA of user A or a main user identifier MUIB of user B and the second index i may denote a corresponding application frontend identifier AFI1, AFI2, AFI3 etc. According to embodiments the application user identifier is derived from the public key of the AUI key pair.

The cryptographic key pair $pk_{AUIii}$, $sk_{AUIii}$ can be used by the computational unit 15a to sign certifications/certificates, e.g. the certifications 520 and 521. Hence according to such an embodiment the computational unit 15a uses for each of the certifications a separate cryptographic key pair $pk_{AUIii}$, $sk_{AUIii}$ to provide signatures on the certifications for a corresponding application user identifier. The certification 520 is e.g. signed by a digital signature $\sigma_{pkAunii}$ under the public key $pk_{AUIii}$, wherein ii denotes the main user identifier MUIA for user A and the application frontend identifier AFI1 for the frontend FE1. The certifications 520, 521 can then be used by the user or the application frontend to authenticate to the network 501, in particular to one of the application computational units $CU_{A1}$, $CU_{A2}$ or $CU_{A3}$.

FIG. 7 shows a flow chart 700 of methods steps of a computer-implemented method for authenticating users of the networks 500 and 501. The methods will be in the following described with reference to FIG. 7 and FIGS. 5*a* and 5*b*.

In FIG. 7, the identity service is split into an identity backend BE, 701 and an identity fronted FE, 702. Furthermore, it is referred to an application frontend FE, 703 and a user 704 having user devices/cryptographic devices.

At a step 705, the identity backend 701 stores authentication information for a user under a user identifier, in particular a main user identifier. This may be done in particular during a previous registration of one or more user devices of a user under the main user identifier as illustrated with reference to FIG. 6.

At a step 710, the user 704 requests access to an application/application service that is running on a node of the network via an application frontend, e.g. by one of the computational units 15*b*.

At a step 720, the application frontend 703 generates a session public key of a public key verification or signature scheme comprising a cryptographic key pair and provides, at a step 730, the session public key to the frontend 702 of the identity service, e.g. the session public key $pk_{session1}$ as shown in FIGS. 5*a*, 5*b*.

At a step 740, the identity frontend 702 asks the user to authenticate with the identity service and provides/sends a corresponding authentication request/authentication form. Accordingly, the user is connected with the identity service and authenticates, e.g. by means of a crypto device or by a password, at a step 750 to the identity service.

A corresponding authentication response is sent/provided at a step 760 to the identity frontend 702 including the main user identifier of the respective user. The identity frontend 702 provides then the main user identifier MUI and an application frontend identifier AFI to the backend 701, at a step 765.

The identity backend 701 generates then, at a step 770, a corresponding application user identifier AUI and a corresponding certification, e.g. one of the certifications 520, 521 as illustrated in FIGS. 5*a*, 5*b*. Referring e.g. to the certification 520, it comprises the session public key $pk_{session1}$ and an application user identifier AUI for the frontend FE1, 530. The application user identifier is derived from the corresponding main user identifier of the User A and the application frontend identifier AFI1 of the frontend FE1. The application frontend identifier relates to or is linked to an identity of the application frontend. The application frontend identifier may be considered as metadata of the communication and may be obtained by the underlying communication protocol in a secure manner. In other words, the means of communication between the application frontend and the identity service provide as application frontend identifier a trustworthy indication to the origin of the respective request.

Then, at a step 780, the application frontend 703 receives/obtains the certification 520 from the identity service.

At a step 790, the application frontend 703 may submit the obtained certificate 520 to an application provider, e.g. to a node of the network 700 which hosts an application computational unit. The obtained certificate may then be used by the application frontend to authenticate/log in to an application or application service provided e.g. by an application computational unit, e.g. by one of the application computational units $CU_{A1}$, $CU_{A2}$ or $CU_{A3}$ as shown in FIGS. 4, 5*a* and 5*b*. The frontend of the computational unit may then execute signatures with the respective session private key. The computational unit itself (backend) may then use the session public key to validate signatures that have been executed by the frontend with the session private key.

According to embodiments, the application user identifier may be a hash of the public key $pk_{AUIii}$ of the respective AUI key pair or it may just correspond to or be equal to the public key of the AUI key pair.

According to embodiments the AUI key pair may be deterministically calculated from the main user identifier MUI of the respective user and the application frontend identifier AFI of the respective frontend.

The certificates 520, 521 may comprise a validity term "exp." which specifies a validity period of the session public key, e.g. an expiration time.

Hence the certificate 520 may establish a temporary authorization or delegation to the application frontend 530 to authenticate and/or to execute a signature under the corresponding application user identifier $AUI_{MUIA/AFI1}$ and the certificate 521 establishes a temporary authorization or delegation to the application frontend 531 to authenticate and/or to execute a signature under another (different) application user identifier $AUI_{MUIA/AFI2}$.

Figure 8:
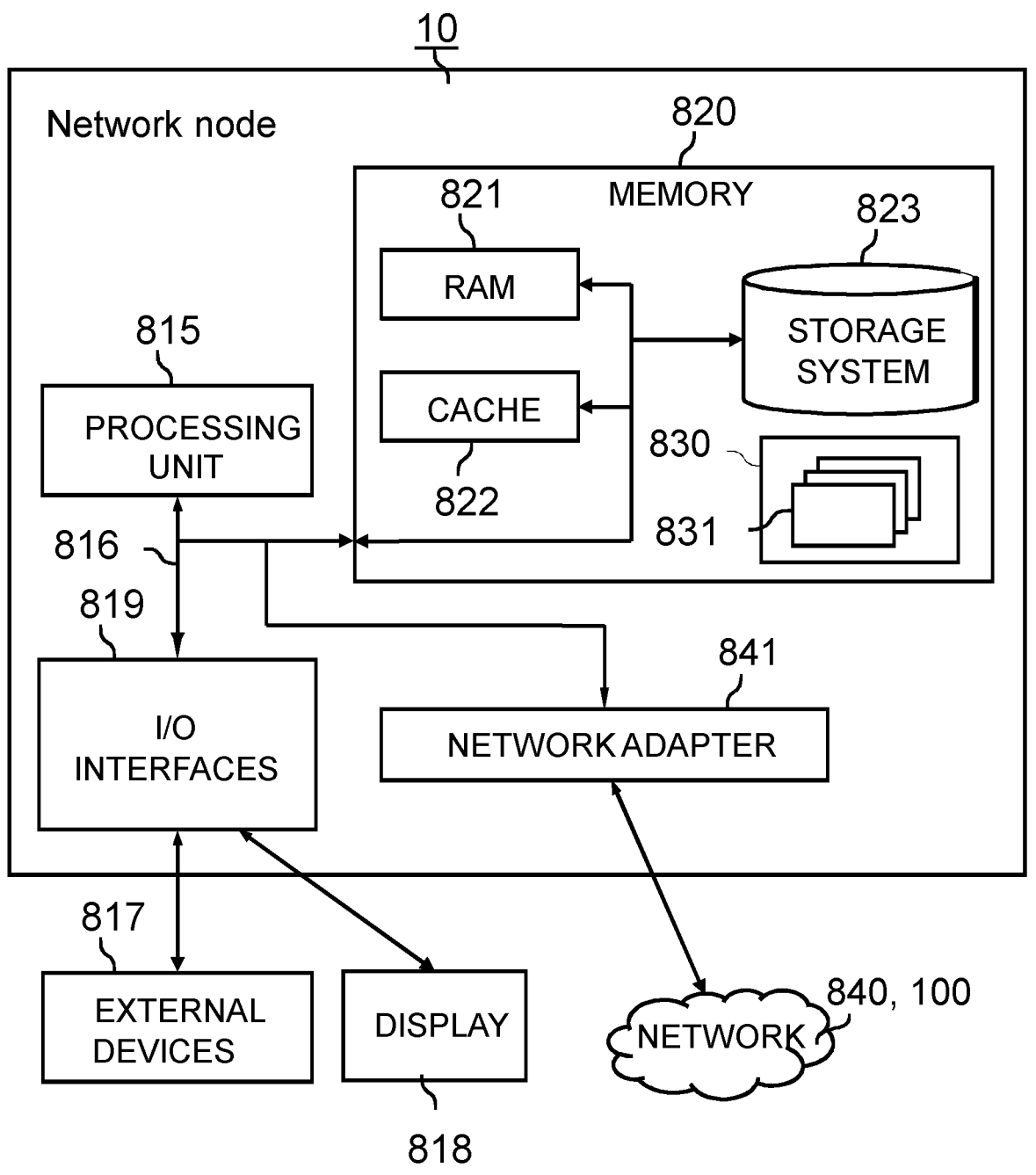
FIG. 8 shows an exemplary embodiment of a node according to an embodiment of the invention.

Referring now to FIG. 8, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform a computer-implemented method for providing a user of a distributed network access to computational results computed by the distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 815, a system memory 820, and a bus 816 that couples various system components including system memory 820 to processor 815.

Bus 816 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 820 can include computer system readable media in the form of volatile memory, such as random access memory (RAM) 821 and/or cache memory 822. Network node 810 may further include other removable/non-removable, volatile/non-volatile computer system storage media. By way of example only, storage system 823 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 816 by one or more data media interfaces. As will be further depicted and described below, memory 820 may include at least one computer program product having a set (e.g., at least one) of program modules that are configured to carry out the functions of embodiments of the invention.

Program/utility 830, having a set (at least one) of program modules 831, may be stored in memory 820 by way of example, and not limitation, as well as an operating system, one or more application programs, other program modules, and program data. Each of the operating system, one or more application programs, other program modules, and program data or some combination thereof, may include an implementation of a networking environment. Program modules 831 generally carry out the functions and/or methodologies of embodiments of the invention as described herein. Program modules 831 may carry out in particular one or more steps of a computer-implemented method for providing a user of a distributed network access to computational results computed by the distributed network, e.g. of one or more steps of the methods as described above.

Network node 10 may also communicate with one or more external devices 817 such as a keyboard or a pointing device as well as a display 818. Such communication can occur via Input/Output (I/O) interfaces 819. Still yet, network node 10 can communicate with one or more networks 40 such as a local area network (LAN), a general wide area network (WAN), and/or a public network (e.g., the Internet) via network adapter 841. According to embodiments the network 840 may be in particular a distributed network comprising a plurality of network nodes 10, e.g. the network 100 as shown in FIG. 1. As depicted, network adapter 841 communicates with the other components of network node 10 via bus 816. It should be understood that although not shown, other hardware and/or software components could be used in conjunction with network node 10.

In the following some further details of an identity service according to embodiments of the invention will be given. The following description describes the identity service from the user side:

The identity service according to embodiments of the invention enables a user to authenticate her identity securely when she accesses applications or application services running on or provided by a distributed network, in particular by computational units running on nodes of the distributed network. A different identity, which is referred to according to embodiments as application user identity (AUI), is created for each application or application service to which the user logs in to, and the user will be able to use all of her registered devices or authentication methods to log in to the same account.

The identity service according to embodiments of the invention does not require a user to set and manage passwords, generate a cryptographically-secure seed phrase, or provide any personal identifying information to applications/applications services or the network. Instead, the user may create authentication profiles that use the authentication methods she chooses such as facial recognition from a smartphone or a security key on her laptop.

According to embodiments, the identity service may be built on the Webauthn protocol. Web Authentication (WebAuthn) is a web standard published by the World Wide Web Consortium (W3C). The standard provides a standardized interface for authenticating users to web-based applications and services using public-key cryptography.

According to embodiments, the identity service uses secure cryptographic authentication provided by security chips built into devices of the user such as smartphones or laptops or by security keys or security tokens plugged into the an interface such as an USB port of a user computer. When the user first registers with the identity service provided by embodiments of the invention, the security chip on the user device will generate a unique cryptography key, in particular a public key of a public key verification scheme, that will be stored by the network, in particular by the identity computational units, under a main user identifier, e.g. a user number that is generated for the user. Using that main user identifier, a user can register other devices, so that she is able to use applications/applications services of the network seamlessly across all of her devices.

When a user logs in to an application or application service that is run on the (distributed) network, the browser will be redirected to the identity service to (re-)generate the identity of the user, e.g. by generating an application user identifier for or with the respective application/application service. The user will be asked to authenticate with the identity service and the identity service will generate an authorization for the respective application user identifier. The authentication may be in particular issued as certificate/certification. The browser of the user will then download this authorization, e.g. the certification, redirect back to the application the user is about to log into, and present the authorization/certification together with the application user identifier to the application. The application can now verify the authorization from the identity service and thus will know that it talks to the user that it knows as application user identifier. The application user identifier may be just a string. According to embodiments, a user has a different application user identifier with different applications. However, the application user identifier will be the same across all the devices of the user as the identity service (and only it) know that these are just different means that the user uses to authenticate w.r.t to her main user identifier. In this respect it should be noted that only the identity service could possibly link the different identities it generates for the user for the different accounts. However, according to embodiments, the network may be programmed not to do so and to make it impossible to link different identities of the user.

In the following an example is given how a user may use the identity service according to embodiments of the invention.

At first, it is described how a main user identity may be created.

When the user first logs in to an application or application service which runs on a node of a network according to embodiments of the invention, the user will be directed to the identity service and be asked to enter a main user identifier such as a user number to log in. If the user is new, she may click a button "Register with Network Identity."

The user may then enter a name for the device profile she is using to create her identity. For example: iPhone, or YubiKey.

Next the user may choose to authenticate using either a security key, or with an authentication method of the device she is using, if that option is available.

For example, if the user device has biometrics enabled, the user might see the option to use those as authentication method. The user may also use the password that unlocks her computer or a pin that unlocks her phone, depending on the device she is using.

As a preferred practice, a dedicated security key should be used. The user may then add another authentication device if she prefers to use one, such as her phone, and store the key in a safe place in the event that the user is unable to use the preferred device.

Next the user may click "Register" when prompted to complete the registration.

Once the user has registered the respective device, she will receive a main user identifier, e.g. a user number.

This user number is unique, but it is not a secret, so it should be saved in multiple places. The browser may remember the user number, but it is needed if the user wants to log in on a different computer, or if the user clears her browser state. If the user loses her user number and is logged out on all devices, the user cannot log in to the identity service to manage her devices, or access any of her applications.

On the next screen, the user may see her user number and her registered authentication devices.

From there, the user can only remove devices. To add another method of authentication, the user must access the identity service from the device she wants to add.

The workflow for adding a device can vary depending on what device profiles the user has already added to her identity. For example, if the user first authorized her computer to create her user number, and she would like to add her phone as a second authentication method, she must be able to authenticate her phone on the authorized computer. Generally a user must always be able to authorize the device she is adding, using a device that is already authorized.

In the following it is described how a user can register her phone as an additional authentication method.

At a first step, the user may open the identity service of the network in her phone's browser.

Then she may click a button "Already registered but using a new device?".

Next she may enter her main user identifier, e.g. her user number and may click "Continue".

Next she may select an option "Use this device with screen lock".

Then the user will be asked to unlock the device.

To use the screen lock option, the user needs to have screen lock activated on her phone. To unlock the phone, either biometric authentication or a pin number may be used.

Then the phone may be authorized as follows.

After the user has unlocked her phone, she will be provided with a URL and a QR code. She must use the URL or QR code in a browser in the computer that has already been authorized. For example, she can copy the URL and email it to herself, then paste it into a browser on the computer.

Then the user has to enter her main user identifier/user number and click Login.

In order to link her phone to her identity, the user should ensure that the link she pasted in the browser came from her. Then she may click a button "Yes, link new device" to proceed with the linking.

Next she may give the device profile a name and click a button "Link Device".

The phone of the user will then be redirected to the login page, and the user can now use it to login.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In the following some further details of an exemplary specification which may be used according to embodiments is provided.

The identity service according to embodiments of the invention comprises as backend an identity computational unit with a well-known identity, in the following ii_canister_id. Furthermore, it comprises as frontend a web application served by the backend computational unit.

Similarly, the (client) applications may consist of a frontend (served by a computational unit) and (typically) one or more backend computational units. Only the frontend interacts with the identity service directly (via a client authentication protocol described below).

According to embodiments the identity service may allow users to maintain identities on the corresponding distributed network, to log in with these identities using one out of a set of secure/security devices and manage their set of security devices. According to embodiments, functional requirements may include that users have separate identities per (client) application (more precisely, per application frontend "hostname") and that these identities are stable, i.e., do not depend on a user's security devices. Furthermore, the client frontends may interact with any computational unit on the network under the user's identity with that frontend. According to embodiments a security device does not need to be manually touched upon every interaction with a client application and a login may be valid for a certain amount of time per identity.

Embodiments of the invention may be based on a security assumption that the delivery of frontend applications is secure. In particular, a user accessing the identity service frontend through a TLS-secured HTTP connection cannot be tricked into running another web application.

According to embodiments, the identity computational unit may control all user identities. According to embodiments, the computational units may maintain a salt.

According to embodiments a user may have a separate user identity for each client application frontend. This identity may be a self-authenticating id that may be derived from a computational unit signature public "key" based on the ii_canister_id and a seed.

The identity service backend may store the following data in user accounts, indexed by the respective user number: a set of device information, consisting of the device's public key (e.g. DER-encoded), a device alias, chosen by the user to recognize the device and an optional credential id, which may be necessary for WebAuthN authentication.

When a client application frontend wants to log in as a user, it may use a session key (e.g., Ed25519 or ECDSA), and by way of an authentication flow obtains a delegation chain that allows the session key to sign for the user's main identity.

The delegation chain may consist of one delegation, called the client delegation. It may delegate from the user identity (for the given client application frontend) to the session key. This delegation may be created by the identity service computational unit, and signed using a computational unit signature.

The identity service frontend may also manage an identity frontend delegation, delegating from the security device's public key to a session key managed by this frontend, so that it can interact with the backend without having to invoke the security device for each signature.

According to embodiments, the client application frontend should support delegation chains of length more than one. According to embodiments, the identity frontend may base the user identity on elements including protocol, full hostname and port. According to embodiments changing protocol, hostname (including subdomains) or port may invalidate all user identities.

According to embodiments the network may provide a delegation method. The delegation method may cause the identity service backend to prepare a delegation from the user identity associated with the given user number and the (client) application frontend hostname to the given session key. This method may return the user's identity that is associated with the given (client) application frontend hostname.

According to embodiments the expiration period of a certification may be determined by the backend.

According to embodiments, a login for an initial registration by the identity service may encompass that the frontend asks the security device to create a new public key. Then frontend creates a session key and creates a delegation from the security device key to the session key, and signs it with the security key. Such signed delegation may be denoted as frontend delegation. The frontend may then configure an agent to use the session key for all further update calls and register the user e.g. under a user number.

While there are shown and described presently preferred embodiments of the invention, it is to be distinctly understood that the invention is not limited thereto but may be otherwise variously embodied and practiced within the scope of the following claims.

The invention claimed is:

1. A computer-implemented method for authenticating users of a network, the method comprising the steps of
   maintaining, by an identity service, user accounts under a main user identifier, the user accounts supporting a method of authentication by the user;
   generating, by an application frontend, a session public key of a public key verification scheme;

providing, by the application frontend, the session public key to the identity service;

obtaining, by the application frontend, a certification from the identity service, the certification comprising the session public key and an application user identifier, the application user identifier being derived from the main user identifier and an application frontend identifier, wherein the application user identifier is an identifier that provides an identity for the respective user of the network with or for a corresponding application or application service of the network; and the application frontend identifier relates to an identity of the application frontend between the respective user and the corresponding application or application service of the network.

2. A computer-implemented method according to claim 1, further comprising submitting, by the application frontend, the obtained certification and the application user identifier to an application provider, the application provider being configured to provide applications or applications services.

3. A computer-implemented method according to claim 2, wherein the application provider is embodied as a node of the network which hosts the application service or the application, in particular an application computational unit.

4. A computer-implemented method according to claim 1, wherein the step of obtaining the certification comprises generating authentication information that is valid with respect to a public key of the identity service.

5. A computer-implemented method according to claim 1, wherein the method, in particular the step of obtaining the certification, comprises generating a separate cryptographic key pair, in particular an application user identifier key pair, for each pair of a respective main user identifier and a respective application frontend identifier, the separate cryptographic key pair comprising a public key and a private key, in particular an application user identifier public key and an application user identifier secret key, wherein the application user identifier is in particular derived from the public key of the separate cryptographic key pair.

6. A computer-implemented method according to claim 5, wherein the application user identifier is derived from the public key of the separate cryptographic key pair, wherein the application user identifier is in particular a hash of the public key of the separate cryptographic key pair or wherein the application user identifier corresponds to the public key of the separate cryptographic key pair, wherein the separate cryptographic key pair is in particular deterministically calculated from the main user identifier and the application frontend identifier.

7. A computer-implemented method according to claim 1, wherein the certification comprises a validity term which specifies a validity period of the session public key.

8. A computer-implemented method according to claim 1, wherein the certification comprises a signature under a public key of the identity service.

9. A computer-implemented method according to claim 5, wherein the certification comprises a signature under a respective public key of the separate cryptographic key pair corresponding to the application user identifier.

10. A computer-implemented method according to claim 1, wherein the certification establishes an authorization or delegation, in particular a temporary authorization or delegation to the application frontend to authenticate and/or to execute a signature under the application user identifier.

11. A computer-implemented method according to claim 1, wherein the application user identifier is derived from the main user identifier, the application frontend identifier and a secret salt.

12. A computer-implemented method according to claim 1, wherein the application frontend establishes an interface, in particular a temporary interface, between a user of the distributed network and an application computational unit, the application computational unit being configured to provide application services.

13. A computer-implemented method according to claim 1, wherein the application frontend runs in or on a browser and wherein the browser is configured to generate and manage the session public key and the corresponding session private key.

14. A computer-implemented method according to claim 1, wherein the network is a distributed network comprising one or more replicated computing clusters, the replicated computing clusters comprising a plurality of nodes, wherein each of the plurality of nodes of the replicated computing cluster is configured to run a replica and each of the replicas is configured to run one or more computational units, the computational units encompassing application computational units for performing application services to users of the network and identity computational units for providing the identity service.

15. A computer-implemented method according to claim 1, wherein the network is a distributed network comprising a plurality of subnetworks, wherein each of the plurality of subnetworks comprises a set of assigned nodes, wherein replicas of the assigned nodes of the plurality of subnetworks are configured to perform a deterministic and replicated computation across their respective subnetworks, thereby forming a plurality of replicated computing clusters.

16. A computer-implemented for managing identities in a network, in particular in a distributed network, the method comprising the steps of generating, by a first user device, a first cryptographic key pair comprising a first public key;

submitting, by a user of the first user device, the first public key to an identity service;

registering, by the identity service, the first public key under a main user identifier;

generating, by a second user device of the user, a second cryptographic key pair comprising a second public key;

submitting, by the user of the first and the second user devices, the main user identifier and the second public key to the identity service;

providing, by the identity service, to the user of the first and the second user devices, an authentication request/form to authenticate with respect to the first public key;

generating, by the first user device, authentication information that is valid with respect to the first public key;

receiving, by the identity service, an authentication response comprising the authentication information of the first user device being valid with respect to the first public key; and registering, upon successful authentication, the second public key under the main user identifier.

17. A computer-implemented method according to claim 16, wherein the step of providing the authentication request comprises providing a link, a barcode or other authentication means, the link, the barcode or the other authentications means comprising an authentication form to authenticate with respect to the first public key.

18. A computer-implemented method according to claim 16, further comprising authenticating with respect to the first public key and/or the second public key by means of a face scan, a fingerprint and/or a password.

19. A distributed network comprising a plurality of nodes including hardware processors, wherein the distributed network is configured to perform a method comprising:

maintaining, by an identity service, user accounts under a main user identifier, the user accounts supporting a method of authentication by the user;

generating, by an application frontend, a session public key of a public key verification scheme;

providing, by the application frontend, the session public key to the identity service;

obtaining, by the application frontend, a certification from the identity service, the certification comprising the session public key and an application user identifier, the application user identifier being derived from the main user identifier and an application frontend identifier, wherein the application user identifier is an identifier that provides an identity for the respective user of the distributed network with or for a corresponding application or application service of the distributed network; and the application frontend identifier relates to an identity of the application frontend between the respective user and the corresponding application or application service of the distributed network.

20. A computer program product for operating a network, the computer program product comprising a non-transitory computer readable storage medium having program instructions embodied therewith, the program instructions executable by one or more of a plurality of nodes to cause the one or more of the plurality of nodes to perform a method comprising:

generating, by a user first device, a first cryptographic key pair comprising a first public key;

submitting, by a user of the first user device, the first public key to an identity service;

registering, by the identity service, the first public key under a main user identifier;

generating, by a second user device of the user, a second cryptographic key pair comprising a second public key;

submitting, by the user of the first and the second user devices, the main user identifier and the second public key to the identity service;

providing, by the identity service, to the user of the first and the second user devices, an authentication request/form to authenticate with respect to the first public key;

generating, by the first user device, authentication information that is valid with respect to the first public key;

receiving, by the identity service, an authentication response comprising the authentication information of the first user device being valid with respect to the first public key; and registering, upon successful authentication, the second public key under the main user identifier.

\* \* \* \* \*